United States Patent
Fattal et al.

(10) Patent No.: US 8,542,960 B2
(45) Date of Patent: Sep. 24, 2013

(54) TUNABLE RING RESONATOR

(75) Inventors: David Fattal, Mountain View, CA (US); Sagi Mathal, Palo Alto, CA (US); Marco Fiorentino, Mountain View, CA (US); Charles Santori, Palo Alto, CA (US); Robert G Walmsley, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1265 days.

(21) Appl. No.: 12/262,419

(22) Filed: Oct. 31, 2008

(65) Prior Publication Data

US 2009/0238515 A1    Sep. 24, 2009

Related U.S. Application Data

(60) Provisional application No. 61/037,902, filed on Mar. 19, 2008.

(51) Int. Cl.
  *G02B 6/26* (2006.01)
  *G02B 6/42* (2006.01)
  *G02B 6/12* (2006.01)

(52) U.S. Cl.
  USPC .................. 385/30; 385/14; 385/32

(58) Field of Classification Search
  USPC .................. 385/14, 15, 27, 30, 32, 39
  See application file for complete search history.

(56) References Cited

U.S. PATENT DOCUMENTS

| | | | |
|---|---|---|---|
| 6,411,752 B1 * | 6/2002 | Little et al. | 385/17 |
| 6,701,033 B2 * | 3/2004 | Okayama | 385/16 |
| 6,751,368 B2 * | 6/2004 | Lim et al. | 385/14 |
| 6,839,488 B2 * | 1/2005 | Gunn, III | 385/40 |
| 7,203,403 B2 * | 4/2007 | Gunn, III | 385/50 |
| 7,447,387 B2 * | 11/2008 | Shih et al. | 385/2 |
| 2004/0120638 A1 * | 6/2004 | Frick | 385/27 |
| 2006/0215949 A1 * | 9/2006 | Lipson et al. | 385/2 |

* cited by examiner

*Primary Examiner* — Ryan Lepisto
*Assistant Examiner* — Robert Tavlykaev

(57) ABSTRACT

A ring resonator has a first optical waveguide arranged in a loop, a second optical waveguide tangentially optically coupled to the first optical waveguide, and a translatable body configured to selectively move into an evanescent field region of said first optical waveguide.

20 Claims, 8 Drawing Sheets

TUNABLE RING RESONATOR

CROSS-REFERENCE TO RELATED APPLICATION

The present application claims priority from provisional application Ser. No. 61/037,902, filed Mar. 19, 2008, the content of which is incorporated herein by reference in its entirety.

BACKGROUND

Light beams or optical signals are frequently used to transmit digital data, for example, in fiber optic systems for long-distance telephony and internet communication. Additionally, much research has been done regarding the use of optical signals to transmit data between electronic components on circuit boards.

Consequently, optical technology plays a significant role in modern telecommunications and data communication. Examples of optical components used in such systems include optical or light sources such as light emitting diodes and lasers, waveguides, fiber optics, lenses and other optics, photo-detectors and other optical sensors, optically-sensitive semiconductors, optical modulators, and others.

Systems making use of optical components often rely upon the precise manipulation of optical energy, such as a beam of light, to accomplish a desired task. This is especially true in systems utilizing light for high-speed, low-energy communication between two nodes. Often optical resonators are used to selectively filter, switch, or modulate light beams.

Ring resonators are a type of optical resonator. Ring resonators typically have an optical waveguide in a closed loop coupled to a tangential waveguide. Ring resonators also have a characteristic resonant frequency, which can be controlled by selective tuning in some systems.

When light of the appropriate wavelength is introduced into the loop by the tangential waveguide, the light beam builds up in intensity over multiple round-trips through the closed loop due to constructive interference. Alternatively, light of a wavelength apart from the resonant frequency or range of the ring resonator is attenuated by destructive interference in the ring resonator. The resonant optical energy then exits the loop back into the tangential waveguide.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
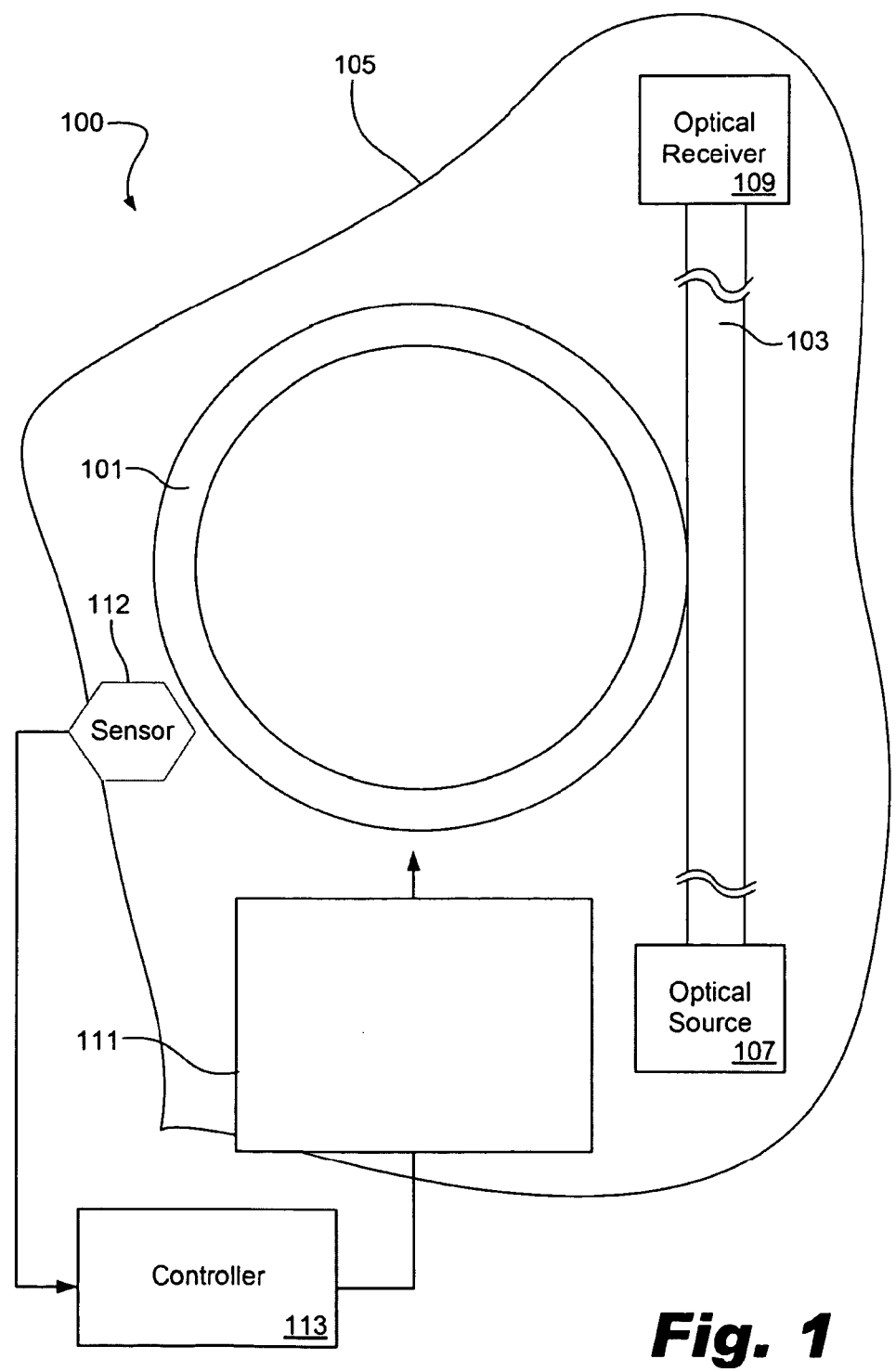
FIG. 1 is a diagram of an illustrative ring resonator according to one embodiment of the principles described herein.

As described above, ring resonators may be used in many different optical devices. Ring resonators typically have a resonant ring that is an optical waveguide in a closed loop. The resonant ring is optically coupled to a tangential waveguide. When light of the appropriate wavelength is introduced into the loop from the tangential waveguide, the light beam builds up in intensity over multiple round-trips through the closed loop due to constructive interference. The optical energy then exits the loop back into the tangential waveguide. Ring resonators have a characteristic resonant frequency, which can be selectively tuned in some systems.

The resonant frequency of a ring resonator may be adjusted by changing the effective index of refraction of the optical signal in the ring. Consequently, it may be desirable, therefore, to integrate with the ring resonator a device that changes the effective refractive index uniformly in the ring resonator. With accurate control of such a device that alters the refractive index in a ring resonator, one can precisely and selectively tune the ring resonator to a desired resonant frequency.

To accomplish these and other goals, the present specification discloses a ring resonator apparatus in which a change in the effective index of refraction is realized by inserting a dielectric body into the evanescent field generated by light circulating in the ring. By moving the dielectric body into such an evanescent field, the overlap between the dielectric body and the evanescent field is changed, and thus the index of refraction of light propagating in the ring is also changed and may be precisely controlled. This, in turn, allows precise control of the resonant frequency of the ring resonator apparatus.

As used in the present specification and in the appended claims, the term "optical energy" refers to radiated energy having a wavelength generally between 10 nanometers and 500 microns. Optical energy as thus defined includes, but is not limited to, ultraviolet, visible, and infrared light. A beam of optical energy may be referred to herein as a "light beam" or "optical beam."

As used in the present specification and in the appended claims when referring optical waveguides, the term "connected" refers to the physical proximity and orientation of at least two optically conductive objects such that an appreciable optical signal through one of the objects is at least partially received in another of the objects.

As used in the present specification and in the appended claims, the term "optical source" refers to a device from which optical energy originates. Examples of optical sources as thus defined include, but are not limited to, light emitting diodes, lasers, light bulbs, and lamps.

As used in the present specification and in the appended claims, the term "evanescent field" refers to a field of optical energy that propagates just outside a waveguide along with an optical beam that is propagating in that waveguide.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems and methods.

Illustrative Systems

Referring now to FIG. 1, a diagram of an illustrative optical resonator (100) is shown. The resonator (100) may have a first optical waveguide arranged in a loop to form a resonator ring (101). A second, tangential optical waveguide (103) may be tangentially connected to the ring resonator (101). In certain embodiments, this tangential connection may include the overlap of corresponding evanescent field regions of the first and second optical waveguides (101, 103). The overlap of corresponding evanescent field regions may allow optical energy traveling through the tangential waveguide (103) to be coupled to and travel through the ring resonator (101), even though the waveguides (101, 103) may not be coupled physically.

The optical waveguides (101, 103) may be fabricated out of semiconductor materials, such as silicon, gallium arsenide, germanium, and the like. The optical waveguides (101, 103) may be fabricated on a substrate (105), such as silicon. In some embodiments, an insulating layer such as silicon dioxide may be fabricated on the substrate (105) and encapsulate the optical waveguides (101, 103).

The ring resonator (101) will have a characteristic resonant frequency, which may be at least partially determined by the cross-sectional dimensions of the first and second optical waveguides (101, 103), the ring dimensions of the ring resonator (101), electrical charges, the material of which the first and second optical waveguides (101, 103) are fabricated, and the operating temperature of the optical resonator (100). The optical resonator (100) may be configured to sustain optical energy having a wavelength that matches the resonant frequency or a range of wavelengths above and below the resonant frequency of the ring resonator (101). All other optical energy may be attenuated or suppressed by destructive interference.

Optical energy may be generated by an optical source (107), such as a laser or a light emitting diode (LED) and enter the resonator (100) through a first end of the tangential waveguide (103). Optical energy having the correct wavelength (i.e. at or near the resonant frequency of the ring resonator (101)) may enter the ring resonator (101) at the tangential optical junction of the ring (101) and the tangential waveguide (103) and resonate through the loop of the ring resonator (101). Optical energy of other wavelengths will be dissipated through destructive interference and the intrinsic losses of the ring (101). The optical signals which are resonant with the ring (101) may then be transmitted through the tangential waveguide (103) to an optical receiver (109) disposed at a second end of the tangential waveguide (103), such as a photodiode or another waveguide. Consequently, the optical resonator (100) may be used to modulate the intensity of a particular wavelength of optical energy by moving in and out of resonance with light of a given frequency.

The resonant frequency of the optical resonator (100) may be tuned by altering an effective index of refraction (n) in the material of the ring resonator (101). The effective index of refraction (n) may differ from an actual index of refraction of the material of the ring resonator (101) due to the evanescent field region of the ring resonator (101) in which optical energy may extend beyond the confines of the outer surface of the ring resonator (101). Thus the effective index of refraction (n) of the ring resonator (101) may be a function of the index of refraction of the waveguide material and the index of refraction of the matter (e.g., air) within the evanescent field region of the ring resonator (101).

Consequently, the effective index of refraction (n) of the ring resonator (101) may be altered by introducing a translatable body (111) into the evanescent field region that has a different index of refraction than that of the matter displaced from the evanescent field region by the translatable body (111), e.g., air, thus altering the resonant frequency of the ring resonator (101). The amount of change in the effective index of refraction (n) of the ring resonator (101) may be related to the index of refraction of the translatable body (111) and the degree to which the translatable body (111) is introduced into the evanescent field region.

In certain embodiments, the translatable body (111) may be introduced into the evanescent field region of the ring resonator (101) using one or more microelectromechanical systems (MEMS). For example, an electrostatic MEMS actuator may be used to selectively move the translatable body (111) in and out of the evanescent field region of the ring resonator (101) as charge is applied to the actuator. In some examples, the translatable body (111) may be a portion of such a MEMS actuator.

In certain embodiments, the translatable body (111) may have a dielectric constant of at least 1.3. As metallic materials and other electrical conductors tend to be optically lossy, a translatable body (111) used as a component in an electrostatic MEMS actuator may operate more efficiently with a higher dielectric constant. For example, the translatable body (111) may include a semiconductor material, such as silicon, germanium, and/or the like.

The translatable body (111) may be used to compensate for fluctuations in the resonant frequency of the optical resonator (100) caused by factors such as shifts in operating temperature of the optical resonator (100). The translatable body (111) may be selectively introduced or removed from the evanescent field region of the ring resonator (101) according to the degree to which the resonant frequency of the optical resonator (100) deviates from a desired value. The movement of the translatable body (111) may alter the effective index of refraction (n) of the ring (101), thus compensating the resonant frequency of the optical resonator (100) according to the fluctuation experienced.

In certain embodiments, a sensor (112) may be included with the optical resonator (100). The sensor (112) may be configured to detect the resonant frequency of the optical resonator (100) and dynamically provide digital or analog data representative of the resonant frequency to a controller (113).

The sensor (112) may include any suitable sensor according to a specific application of the principles described herein. For example, the sensor (112) may be an optical sensor disposed near or within at least one of the optical waveguides (101, 103) and configured to measure the intensity of different wavelengths of light that are transmitted through the first or second waveguides (101, 103) during operations (e.g., diagnostic operations) of the optical resonator (100). By receiving data from the sensor (112), the controller (113) may be configured to compute which wavelength of light is dominant in the optical resonator (100) and thus determine the current resonant frequency of the optical resonator (100).

In other examples, the sensor (112) may include an optical sensor disposed near or within the ring resonator (101) to detect the resonant frequency of the first optical waveguide. In still other embodiments, the sensor (112) may include an electronic sensor configured to measure the amplitude of voltages produced by a photodiode in the optical receiver (109). By detecting trends in the amplitude of these voltages (e.g., a steadily decreasing or increasing mean voltage), shifts in the resonant frequency of the optical resonator (100) may be detected.

The controller (113) may include one or more processing elements. Exemplary processing elements that may be used in the controller (113) include, but are not limited to, computer processors, microcontrollers, application-specific integrated circuits, field programmable gate arrays and the like. A processing element used in the controller (113) may be configured to execute operations stored in memory in conjunction with data received from the sensor (112) to control the movement of the translatable body (111).

To control the movement of the translatable body (111), the controller (113) may be configured to alter a voltage or current at an output pin to cause the translatable body (111) to selectively approach or retract from the ring resonator (101) according to the desired resonant frequency of the optical resonator (100) and a present measured deviation from the desired resonant frequency. For example, in applications where the translatable body (111) includes a MEMS actuator, the dynamic voltage or current output by the controller (113) to a pin coupled to the MEMS actuator may induce movement in the actuator that selectively translates the translatable body (111). In other embodiments, the controller (113) may be configured to move the translatable body (111) by selectively controlling an electric motor, solenoid, spring, or any other type of actuator coupled to the translatable body (111) according to a specific application of the principles described herein.

In the present example, the sensor (112), controller (113), and translatable body (111) may be configured in a feedback loop such that data corresponding to changes in the resonant frequency of the optical resonator (100) may be provided by the sensor (112) to the controller (113), which may allow the controller (113) to compute movements by the translatable body (111) to compensate for those changes. The movements by the translatable body (111) may result in changes in the resonant frequency of the optical resonator (100) that may be detected by the sensor (112), and thus the controller (113) may continue selectively translating the translatable body (111) until the optical resonator (100) is operating within a desired precision of a desired resonant frequency.

In other embodiments, the system described in connection with FIG. 1 may be used to selectively implement different resonant frequencies for the resonator (100) as may be needed over time for different applications. This is different that using the system to maintain a specific resonant frequency which may tend to drift under changing ambient conditions as described immediately above.

Figure 2A:
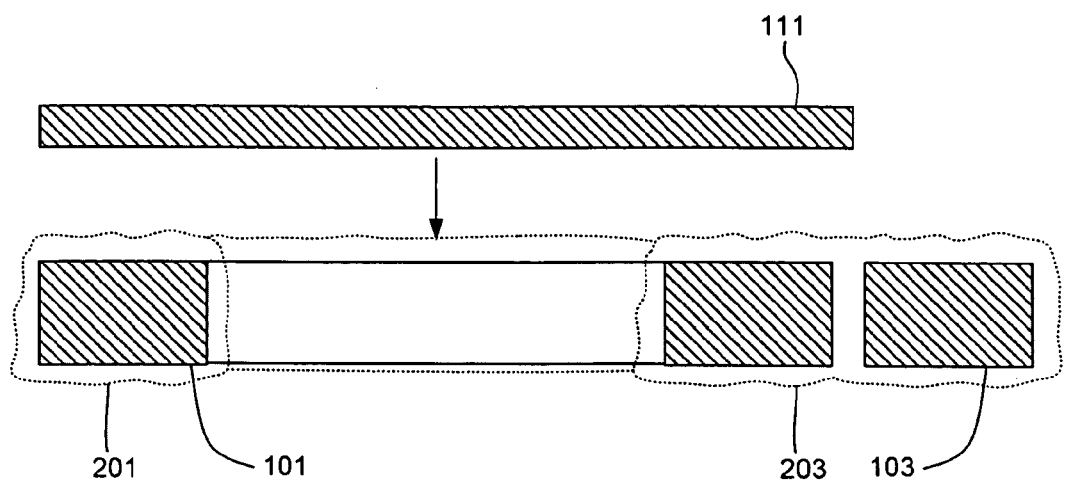
FIGS. 2A-2B are cross-sectional diagrams of an illustrative ring resonator showing possible positions of an illustrative translatable body according to one embodiment of the principles described herein.
Figure 2B:
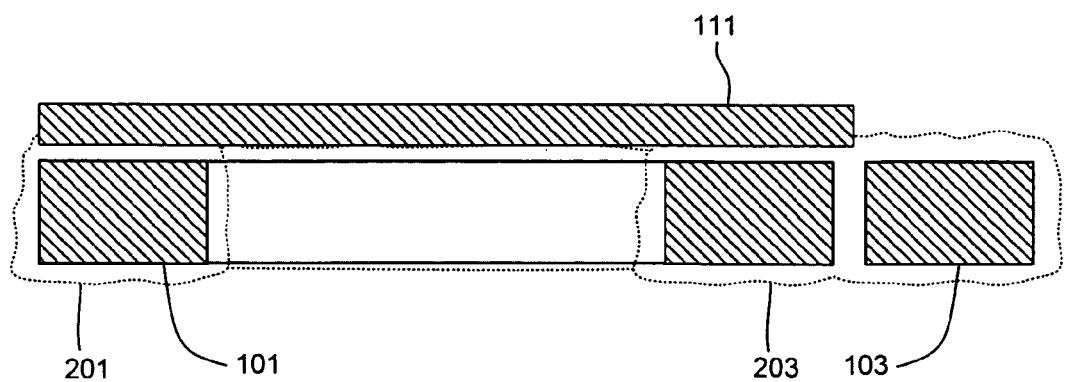

Referring now to FIGS. 2A-2B, cross-sectional views are shown of illustrative first and second optical waveguides (101, 103) in an optical resonator (100, FIG. 1) together with an illustrative translatable body (111).

The optical waveguides (101, 103) are configured to substantially confine and manipulate optical energy transmitted therethrough. However, due to the fact that optical energy cannot be completely discontinuous at a boundary, the optical energy transmitted through the first and second optical waveguides (101, 103) may not be confined to the area within the outer periphery of the optical waveguides (101, 103). Hence, evanescent field regions (201, 203) of optical energy may substantially surround the first and second optical waveguides (101, 103) when optical energy is being transmitted through the waveguides (101, 103).

These evanescent field regions (201, 203) may enable the coupling of optical energy between the ring and tangential optical waveguides (101, 103). For example, the evanescent field regions in the ring and tangential optical waveguides (101, 103) may overlap at the point where the tangential optical waveguide (103) passes closest to the ring resonator (101), thereby creating a merged evanescent field region (203). This merged evanescent field region (203) may allow the optical energy transmitted through the tangential optical waveguide (103) to be received into the loop of the ring resonator (101) and thus undergo wavelength-based filtering from the resonant effects of the ring resonator (101).

These evanescent field regions (201, 203) may also allow the selective positioning of the translatable body (111) to alter the resonant frequency of the optical resonator (100, FIG. 1). As explained above, the resonant frequency of the optical resonator (100, FIG. 1) may be a function of, among other factors, the effective refractive index (n) of the material occupying the evanescent field regions (201, 203) of the ring and tangential optical waveguides (101, 103).

More precisely, where E(r) denotes the electric field distribution of the unperturbed ring resonator optical mode, normalized in a way that $\int \epsilon(r)|E(r)|^2 = 1$ where $\epsilon(r)$ is the dielectric profile of the unperturbed ring, then the resonance shift occurring upon a change $\Delta\epsilon(r)$ of the dielectric environment of the ring is given by $\int \Delta\epsilon(r)|E(r)|^2$.

FIG. 2A shows the translatable body (111) completely outside of the evanescent field regions (201, 203) of the waveguides (101, 103). In this position, the effective refractive index of the optical waveguides (101, 103), and by extension the resonant frequency of the optical resonator (100, FIG. 1), may not be substantially affected by the position of the translatable body (111).

FIG. 2B shows the translatable body (111) positioned within the evanescent field regions (201, 203). In this configuration, the translatable body (111) may alter the effective refractive index (n) of at least the ring resonator (101) and thus alter the resonant frequency of the system (100, FIG. 1). The degree to which the resonant frequency of the optical resonator (100, FIG. 1) is altered by the translatable body (111) may be controlled by selectively adjusting the amount of evanescent field regions (201, 203) that are occupied by the translatable body (111).

In the present example, the translatable body (111) is shown being introduced to the evanescent field regions (201, 203) of the ring and tangential optical waveguides (101, 103) through controlled vertical movement of the translatable body (111). It will be understood, however, that the translatable body (111) may be configured to move along any axis or combination of axes in linear or nonlinear translation to accomplish the desired tuning, as may suit a particular application of the principles herein.

Moreover, the translatable body (111) may be selectively introduced to any portion or combination of portions of the evanescent field regions (201, 203) to accomplish the desired tuning, as may suit a particular application of the principles herein. Additionally, there may be multiple translatable bodies that are used to selectively encroach on the evanescent field regions (201, 203).

Figure 3:
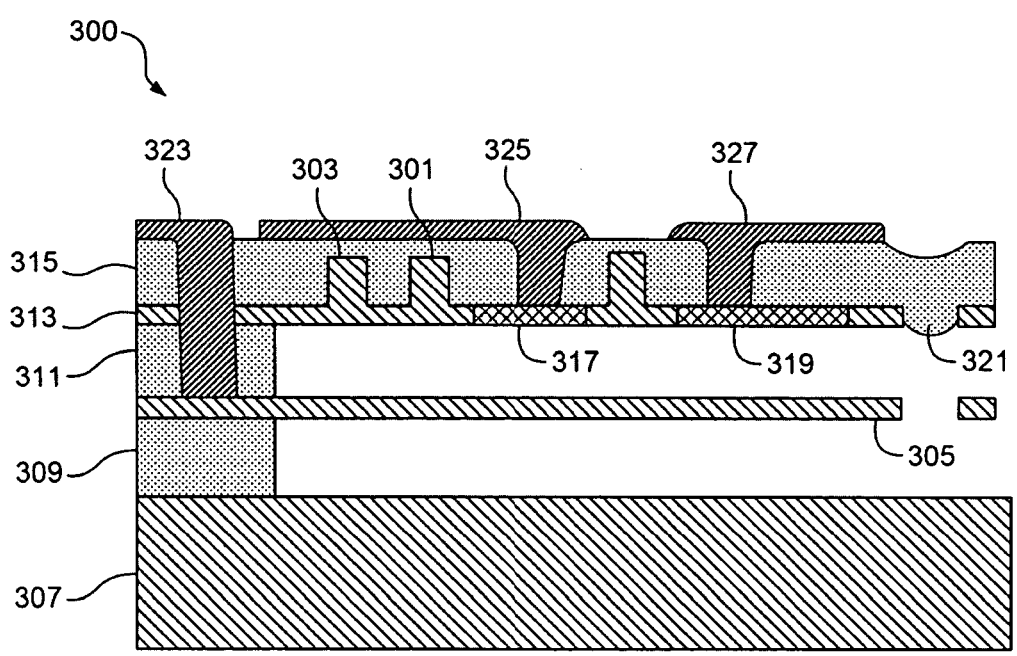
FIG. 3 is a cross-sectional diagram of an illustrative ring resonator according to one embodiment of the principles described herein.

Referring now to FIG. 3, a cross-sectional view of an illustrative optical resonator (300) is shown. The ring resonator (300) may include a first optical waveguide or ring resonator (301) formed into a loop and a second optical tangential waveguide (303) tangentially coupled to the ring resonator (301). A translatable body (305) may be used to selectively tune the resonant frequency of the optical resonator (300) according to the principles described above. In the present example, the translatable body (305) is an electrostatic MEMS actuator that may be selectively introduced into the evanescent field region of the waveguides (301, 303) by applying the correct polarity of charge to the translatable body (305).

The optical resonator system (300) may be fabricated on a semiconductor substrate (307) (e.g., a silicon wafer). A first oxide layer (309) may be disposed on the semiconductor substrate (307) to electrically and optically isolate the semiconductor substrate (307) from the translatable body (305) and the waveguides (301, 303). The translatable body (305) may be a second layer of semiconductor material that is grown over the first oxide layer (309), with a portion of the oxide layer (309) being undercut to provide room for the translatable body (305) to move vertically.

A second oxide layer (311) may be deposited over a portion of the translatable body (305) and separate the translatable body (305) from a third layer of semiconductor material (313) on which the optical waveguides (301, 303) are formed. The third layer of semiconductor material (313) may include doped regions (317, 319) which may be used to selectively inject and remove charge from the ring resonator (301) in order to modulate data optically to the optical energy transmitted through the waveguides (301, 303).

A third oxide layer (315) may be deposited over the third layer of semiconductor material (313) to provide insulation and structure to the optical waveguides (301, 303). Additionally, the third oxide layer (315) may seal the opening to a trench (321) used to undercut the first and second layers of oxide (309, 311). In certain embodiments, a plurality of openings may be present within the third oxide layer (315) to anchor the translatable body (305) in a symmetric way around the third layer of semiconductor material (313) such that the translatable body (305) may move up and down in a manner consistent with the symmetry of the third layer of semiconductor material (313).

First, second, and third metal contacts (323, 325, 327) may be deposited over the third oxide layer (315) and be in electrical communication with the translatable body (305) and the doped regions (317, 319), respectively. The first metal contact (323) may be configured to provide an electrostatic charge to the translatable body (305). According to the respective electrostatic charges of the semiconductor substrate (307) and the translatable body (305), the translatable body (305) may be configured to move toward or away from the first and second optical waveguides (301, 303). Thus the resonant frequency of the ring resonator (301) may be selectively tuned accordingly by varying a voltage present on the first electrical contact (323).

The second and third metal contacts (325, 327) may be configured to couple to modulating elements (not shown) that selectively inject or remove charge from the optical waveguides (301, 303) in accordance with an optical modulation scheme to encode data onto the optical energy transmitted through the optical resonator (300).

Figure 4:
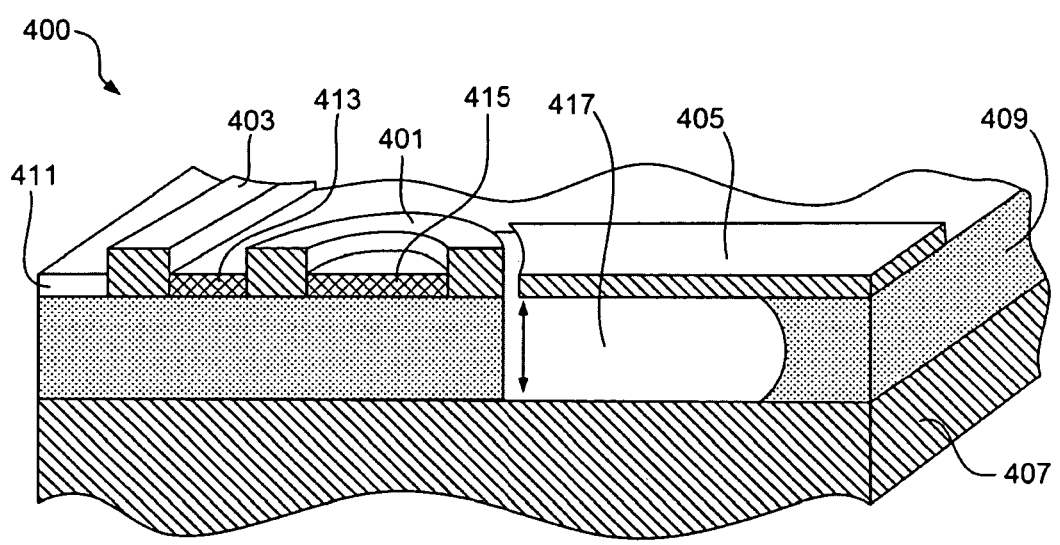
FIG. 4 is a cross-sectional diagram of an illustrative ring resonator according to one embodiment of the principles described herein.

Referring now to FIG. 4, a cross-sectional view of another illustrative optical resonator (400) is shown. Similar to the optical resonator (300, FIG. 3) shown previously, the present optical resonator (400) may include a first optical waveguide or ring resonator (401) formed into a loop and a second tangential optical waveguide (403) tangentially coupled to the ring resonator (401). A translatable body (405) may be used to selectively tune the resonant frequency of the optical resonator (400) according to the principles described above. As in the previous example, the present translatable body (405) is also an electrostatic MEMS actuator that may be selectively introduced into the evanescent field region of the waveguides (401, 403) by applying the correct polarity of voltage between the translatable body (405) and the semiconductor substrate (407).

The optical resonator (400) may include a semiconductor substrate (407) and a layer of oxide (409) deposited over the substrate (407). The optical waveguides (401, 403) and the translatable body (405) may be formed on a second layer of semiconductor material (411) disposed on the layer of oxide (409). Like the example of FIG. 3, the second layer of semiconductor material (411) may include doped regions (413, 415) to modulate data onto the optical energy traveling through the optical resonator (400).

An undercut portion (417) in the layer of oxide (409) may be disposed beneath the translatable body (405) to allow for vertical movement by the translatable body (405) according an electrostatic charge applied to the translatable body (405). The optical resonator (400) of the present example may also include one or more additional layers of oxide material and metal contacts (not shown) to provide an electrical interface to the translatable body (405) and the doped regions (413, 415).

Figure 5A:
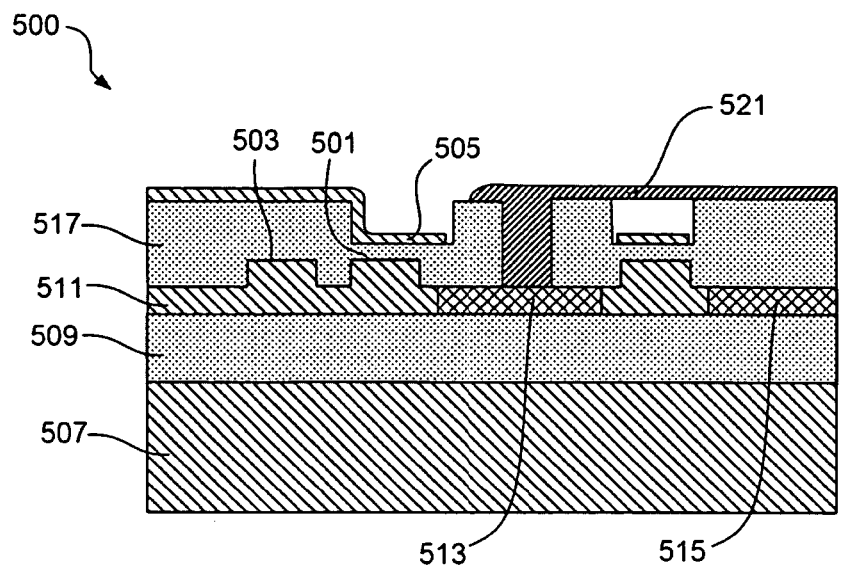
FIGS. 5A-5B are cross-sectional and top view diagrams, respectively, of an illustrative ring resonator according to one embodiment of the principles described herein.
Figure 5B:
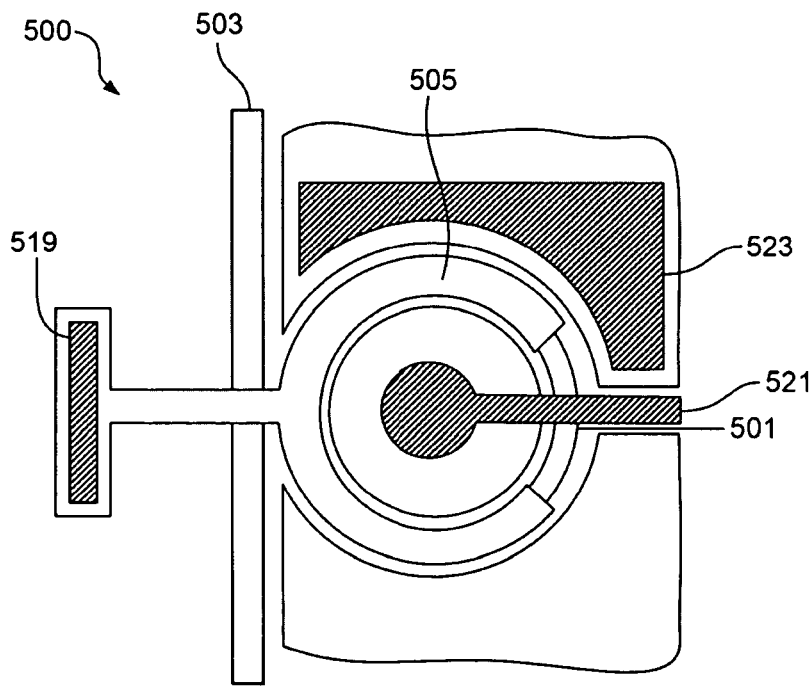

Referring now to FIGS. 5A-5B, another illustrative optical resonator (500) is shown. FIG. 5A is a cross-sectional side view of a portion of the illustrative ring resonator (500), and FIG. 5B is a top view of the illustrative optical resonator (500). Similar to previous examples, the optical resonator (500) of the present example includes a first optical waveguide or ring resonator (501) formed into a loop, a second tangential optical waveguide (503) tangentially coupled to the ring resonator (501), and a translatable body (505) configured to selectively tune the resonant frequency of the optical resonator (500).

Similar to previous examples, the translatable body (505) of the present example is a MEMS electrostatic actuator. The translatable body (505) may be selectively introduced to the evanescent field region of the ring resonator (501) from above, and may include a curved portion corresponding to the entire circumference of the ring resonator (501) or a portion thereof.

The optical resonator (500) may be formed on a semiconductor substrate (507) with a first insulating layer of oxide (509) disposed thereon. The ring resonator and tangential optical waveguides (501, 503) may be formed on a second layer of semiconductor material (511) disposed on the first layer of oxide (509). Portions (513, 515) of the second layer of semiconductor material (511) may be doped for charge injection, according to principles described previously.

A second layer of oxide (517) may be disposed over the second layer of semiconductor material (511) to provide insulation and structural support. In certain embodiments, the second layer of oxide (517) may be partially or completely replaced with air or any other suitable dielectric material that allows adequate movement by the translatable body (505). Electrical contacts (519, 521, 523) may provide electrical access to the translatable body (505), and the doped portions (513, 515) of the second layer of semiconductor material (511), respectively.

Figure 6A:
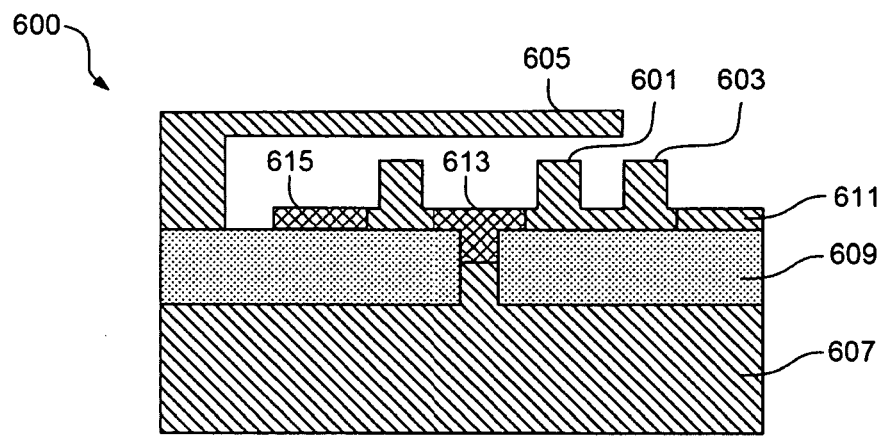
FIGS. 6A-6B are cross-sectional and top view diagrams, respectively, of an illustrative ring resonator according to one embodiment of the principles described herein.
Figure 6B:
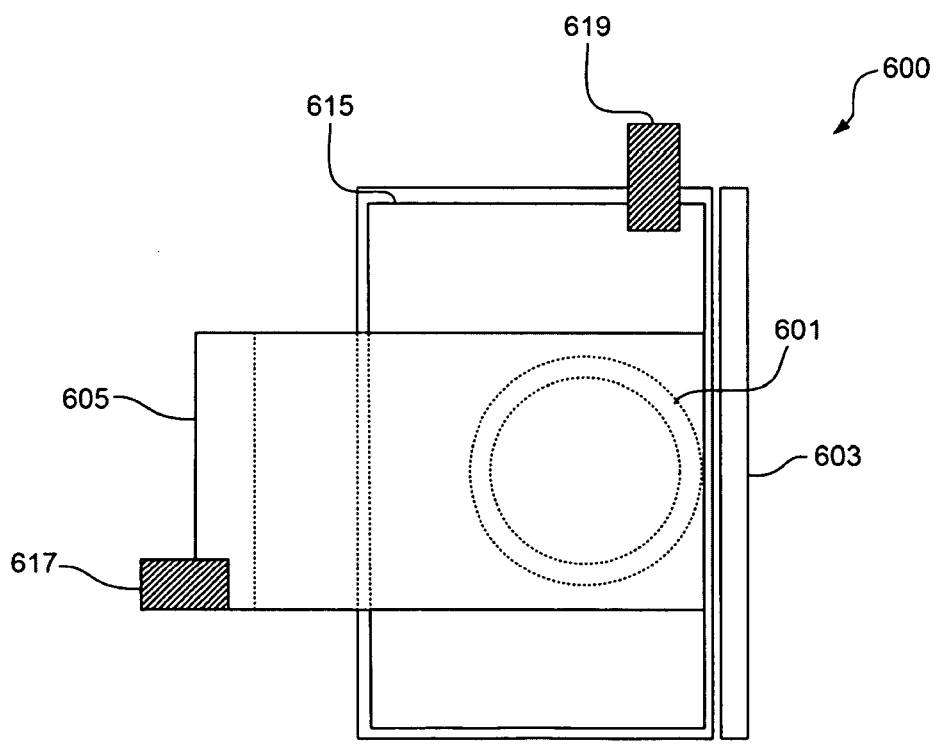

Referring now to FIGS. 6A-6B, another illustrative optical resonator (600) is shown. FIG. 6A is a cross-sectional side view of a portion of the illustrative optical resonator (600), and FIG. 6B is a top view of the illustrative optical resonator (600). Similar to previous examples, the optical resonator (600) of the present example may include a first optical waveguide or ring resonator (601) formed into a loop, a second tangential optical waveguide (603) tangentially coupled to the ring resonator (601), and a translatable body (605) configured to selectively tune the resonant frequency of the optical resonator (600).

Similar to previous examples, the translatable body (605) of the present example is a MEMS electrostatic actuator. The translatable body (605) may be selectively introduced to the evanescent field region of the ring resonator (601) from above, and may include a cantilever geometry.

The optical resonator (600) may be formed on a semiconductor substrate (607) with a first insulating layer of oxide (609) disposed thereon. The ring resonator and tangential optical waveguides (601, 603) may be formed on a second layer of semiconductor material (611) disposed on the first layer of oxide (609). Portions (613, 615) of the second layer of semiconductor material (611) may be doped for charge injection, according to principles described previously.

A first of the portions (613) may be in electrical communication with the semiconductor substrate (607) and maintain the electrostatic potential of the substrate (607). In certain embodiments, the substrate (607) and the doped portion (613) in communication with the substrate (607) may be held at a ground potential. In certain embodiments, selective charge injection and removal for modulation purposes may be mainly controlled by altering the electrostatic potential of a second of the doped portions (615).

Electrical contacts (617, 619) may provide electrical access to the translatable body (605), and the second doped portions (615) of the second layer of semiconductor material (611), respectively.

Illustrative Methods

Figure 7:
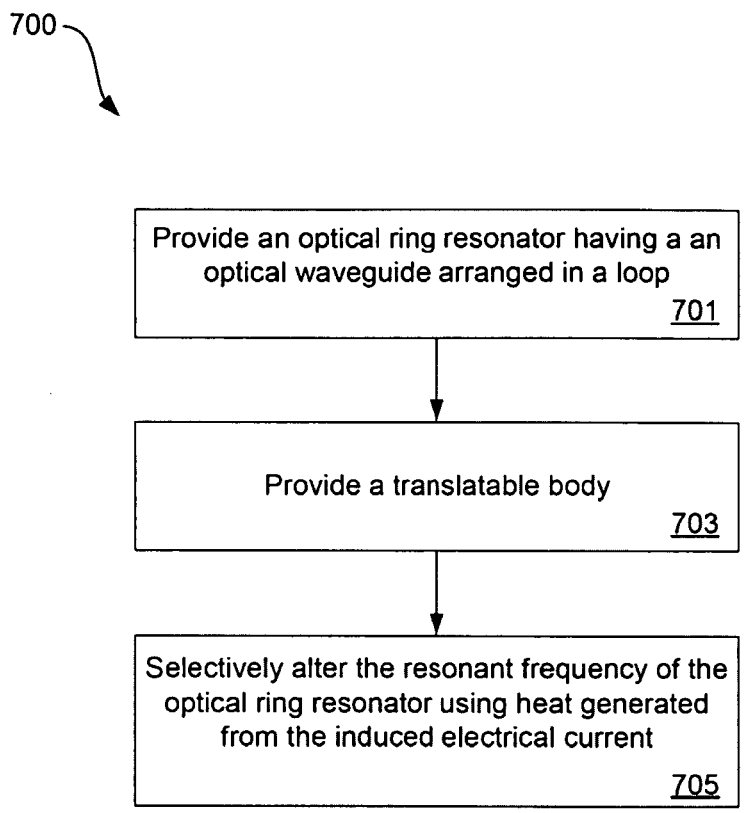
FIG. 7 is a flowchart of an illustrative method of tuning a ring resonator according to one embodiment of the principles described herein.

Referring now to FIG. 7, a flowchart diagram of an illustrative method (700) of selectively tuning a ring resonator is shown.

The method (700) may include providing (step 701) an optical resonator having a semiconductor ring arranged in a loop. A translatable body is also provided (step 703). The resonant frequency of the optical resonator may then be altered (step 705) by selectively positioning the translatable body within an evanescent field region of the optical waveguide. In certain embodiments, this positioning may further include selectively altering an electrostatic charge on the translatable body.

Furthermore, in some embodiments the method (700) may include dynamically receiving data from a sensor corresponding to the resonant frequency of the ring resonator and using the data in a feedback loop to tune the resonator to a desired resonant frequency.

Figure 8:
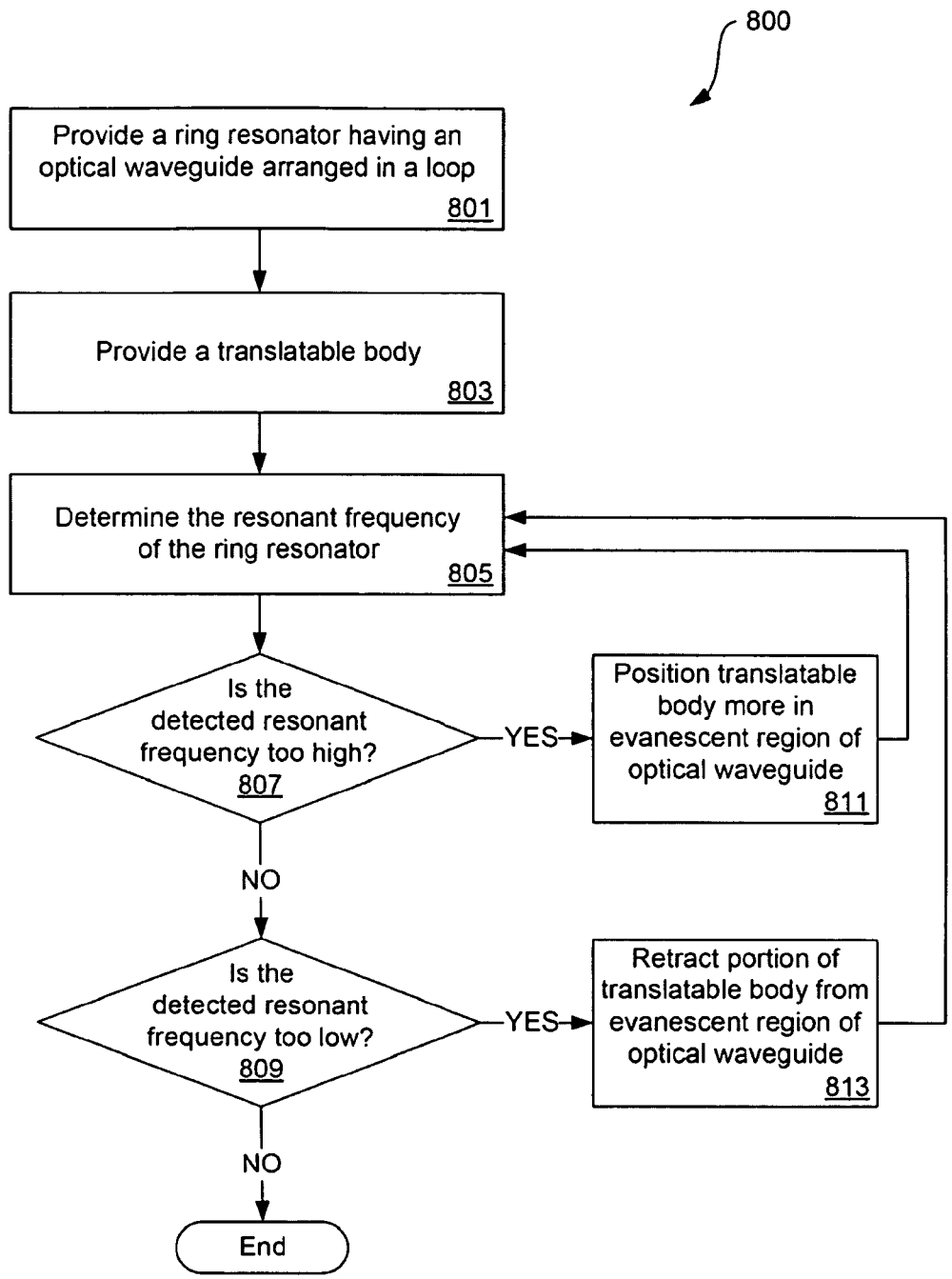
FIG. 8 is a flowchart of an illustrative method of tuning a ring resonator according to one embodiment of the principles described herein.

Referring now to FIG. 8, a flowchart diagram of another illustrative method (800) of tuning a ring resonator is shown.

The method (800) includes providing (step 801) an optical waveguide arranged in a loop. A translatable body is then provided (step 803).

The resonant frequency of the ring resonator is determined (step 805) using a sensor or other means. If it is determined (decision 807) that the detected resonant frequency is too high, the translatable body is positioned (step 811) more in the evanescent field region of the optical waveguide, and the resonant frequency of the ring resonator is again determined (step 805).

If it is determined (decision 809) that the resonant frequency of the ring resonator is too low, a portion of the translatable body is retracted (step 813) from the evanescent field region of the optical waveguide, and the resonant frequency of the ring resonator is again determined (step 805).

Using feedback from the determined resonant frequency, the steps of positioning (step 811) the translatable body more in the evanescent field region and retracting (step 813) a portion of the translatable body from the evanescent field region may be performed until the detected resonant frequency is at a desired value.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A ring resonator, comprising:
a first optical waveguide arranged in a loop;
a second optical waveguide that is tangentially optically coupled to said first optical waveguide;
a first doped semiconductor region, said first doped semiconductor region being surrounded by said loop of said first optical waveguide and electrically coupled to a first electrode that extends from said first doped semiconductor region across a portion of said first optical waveguide;
a second doped semiconductor region disposed outside of said loop of said first optical waveguide, said second doped semiconductor region being electrically coupled to a second electrode such that a selectively applied voltage between said first and second electrodes selectively injects or removes charge from said first optical waveguide; and
a translatable body configured to selectively move into an evanescent field region of said first optical waveguide, said translatable body comprising a curved portion configured to substantially overlap a majority of said first optical waveguide without crossing said first electrode.

2. The ring resonator of claim 1, wherein said translatable body comprises a microelectromechanical system (MEMS) actuator.

3. The ring resonator of claim 1, wherein said translatable body comprises a dielectric constant greater than 1.3.

4. The ring resonator of claim 1, wherein said translatable body comprises a semiconductor material.

5. The ring resonator of claim 1, wherein said first and second optical waveguides are fabricated out of a semiconductor material.

6. The ring resonator of claim 1, further comprising a substrate; wherein said optical waveguides are disposed on said substrate and said first and second doped semiconductor regions are formed within said substrate.

7. The ring resonator of claim 1, further comprising an optical source and photodetector optically coupled with said second optical waveguide.

8. An optical system, comprising:
a ring resonator having;
a first optical waveguide arranged in a loom;
a second optical waveguide that is tangentially optically coupled to said first optical waveguide;
a first doped semiconductor region, said first doped semiconductor region being surrounded by said loop of said first optical waveguide and electrically coupled to a first electrode that extends from said first doped semiconductor region across a portion of said first optical waveguide;
a second doped semiconductor region disposed outside of said loop of said first optical waveguide, said second doped semiconductor region being electrically coupled to a second electrode; and
a translatable body configured to selectively move into an evanescent field region of said first optical waveguide, said translatable body comprising a curved portion configured to substantially overlap a majority of said first optical waveguide without crossing said first electrode; and
a controller configured to selectively tune a resonant frequency of said ring resonator by selectively controlling a position of said translatable body and modulate light transmitted through said ring resonator by selectively applying a voltage between said first and second electrodes.

9. The optical system of claim 8, wherein said controller is configured to adjust a resonant frequency of said ring resonator by selectively moving said translatable body with respect to said evanescent field region of said first optical waveguide.

10. The optical system of claim 9, wherein said controller is configured to selectively apply an electrostatic potential to said translatable body to selectively move said translatable body with respect to said evanescent field region.

11. The optical system of claim 9, further comprising a sensor for sensing the resonant frequency of said ring resonator, wherein said controller is configured to control said translatable body based on output from said sensor.

12. The optical system of claim 8, wherein said first and second optical waveguides are fabricated out of a semiconductor material.

13. The optical system of claim 8, wherein said translatable body comprises a dielectric constant greater than 1.3.

14. The ring resonator of claim 8, wherein said translatable body comprises a semiconductor material.

15. The optical system of claim 8, further comprising an optical source in communication with said second optical waveguide.

16. The optical system of claim 8, further comprising a substrate, wherein said first and second optical waveguides are disposed on said substrate and said first and second doped semiconductor regions are formed within said substrate.

17. A method of selectively tuning a ring resonator, said method comprising:
providing an optical ring resonator having:
an optical waveguide arranged in a loop;
a first doped semiconductor region, said first doped semiconductor region being surrounded by said loop of said first optical waveguide and electrically coupled to a first electrode that extends from said first doped semiconductor region across a portion of said first optical waveguide;
a second doped semiconductor region disposed outside of said loop of said first optical waveguide, said second doped semiconductor region being electrically coupled to a second electrode; and
a translatable body comprising a curved portion configured to substantially overlap a majority of said first optical waveguide without crossing said first electrode; and
selectively altering a resonant frequency of said resonator by selectively positioning said translatable body within an evanescent field region of said optical waveguide.

18. The method of claim 17, wherein said positioning of said translatable body comprises selectively altering an electrostatic charge on said translatable body.

19. The method of claim 17, further comprising dynamically receiving data from a sensor that is sensing said resonant frequency of said resonator.

20. The method of claim 19, further comprising using said data in a feedback loop to tune said resonator to a desired resonant frequency.

* * * * *

UNITED STATES PATENT AND TRADEMARK OFFICE
CERTIFICATE OF CORRECTION

PATENT NO.        : 8,542,960 B2
APPLICATION NO.   : 12/262419
DATED             : September 24, 2013
INVENTOR(S)       : David Fattal et al.

It is certified that error appears in the above-identified patent and that said Letters Patent is hereby corrected as shown below:

In the Claims:

In column 10, line 62, in Claim 8, delete "having;" and insert -- having: --, therefor.

In column 10, line 63, in Claim 8, delete "loom;" and insert -- loop; --, therefor.

In column 11, line 39, in Claim 14, delete "The ring resonator of" and insert -- The optical system of --, therefor.

Signed and Sealed this
Eighteenth Day of February, 2014

Michelle K. Lee
*Deputy Director of the United States Patent and Trademark Office*